(12) United States Patent
Berghoff et al.

(10) Patent No.: US 10,745,897 B2
(45) Date of Patent: Aug. 18, 2020

(54) FLUSH MOUNTED BUILT-IN BODY FOR A SANITARY FITTING WITH AT LEAST ONE PUSH BUTTON WHICH CAN BE VARIABLY POSITIONED

(71) Applicant: Grohe AG, Hemer (DE)

(72) Inventors: Daniel Berghoff, Dortmund (DE); Yukiko Toyoda, Hemer (DE)

(73) Assignee: Grohe AG, Hemer (DE)

( * ) Notice: Subject to any disclaimer, the term of this patent is extended or adjusted under 35 U.S.C. 154(b) by 0 days.

(21) Appl. No.: 16/513,209

(22) Filed: Jul. 16, 2019

(65) Prior Publication Data
US 2019/0338500 A1 Nov. 7, 2019

Related U.S. Application Data

(63) Continuation of application No. PCT/EP2018/050960, filed on Jan. 16, 2018.

(30) Foreign Application Priority Data

Jan. 16, 2017 (DE) .................. 10 2017 100 708

(51) Int. Cl.
*E03C 1/00* (2006.01)
*E03C 1/084* (2006.01)
(Continued)

(52) U.S. Cl.
CPC .............. *E03C 1/042* (2013.01); *E03C 1/041* (2013.01); *E03C 1/0412* (2013.01);
(Continued)

(58) Field of Classification Search
CPC ........ E03C 1/0412; E03C 1/084; E03C 1/041; E03C 1/00; F16K 27/041; F16K 3/14; F16K 27/12; F16K 47/02
See application file for complete search history.

(56) References Cited

U.S. PATENT DOCUMENTS 1,637,230 A * 7/1927 Mueller .................. F16K 27/12
137/360
2,745,433 A * 5/1956 Schneider ............. F16K 27/041
137/596.13
(Continued)

FOREIGN PATENT DOCUMENTS

DE   202015006285 U1   10/2015
GB       1292045 A     10/1972

OTHER PUBLICATIONS

International Search Report dated May 28, 2018 in corresponding application PCT/EP2018/050960.

*Primary Examiner* — Phi D A
(74) *Attorney, Agent, or Firm* — Muncy, Geissler, Olds & Lowe, P.C.

(57) ABSTRACT

A flush-mounted built-in body for a sanitary fitting, having at least one valve for a liquid having a rotatable flow regulator and a threaded shaft, wherein the threaded shaft can be actuated for opening and closing the at least one valve in an axial direction of the at least one valve, having at least one push button for actuating the threaded shaft of the at least one valve in the axial direction, wherein the at least one push button comprises an intermediate part, screwable with the threaded shaft, for setting the at least one push button in the desired position in the axial direction and a cover cap that can be connected nonrotatably to the threaded shaft for securing the intermediate part in the desired position, and having at least one rotating knob for adjusting a flow rate of the liquid.

10 Claims, 3 Drawing Sheets

(51) Int. Cl.
  *E03C 1/042* (2006.01)
  *E03C 1/04* (2006.01)
  *F16K 47/02* (2006.01)
  *F16K 27/12* (2006.01)
  *F16K 27/04* (2006.01)

(52) U.S. Cl.
  CPC ............ *F16K 27/041* (2013.01); *F16K 27/12* (2013.01); *F16K 47/02* (2013.01)

(56) References Cited

U.S. PATENT DOCUMENTS

| | | | | |
|---|---|---|---|---|
| 3,200,830 A | * | 8/1965 | Moyer | F16K 47/02 137/101 |
| 3,251,434 A | * | 5/1966 | Roenick | F15B 21/00 181/233 |
| 3,590,860 A | | 7/1971 | Stenner | |
| 3,598,154 A | * | 8/1971 | Brundage | F16K 3/12 138/94.3 |
| 5,558,120 A | * | 9/1996 | Wilson | E03D 3/00 137/377 |
| 5,617,898 A | * | 4/1997 | Nagai | F04F 5/48 137/884 |
| 5,755,425 A | * | 5/1998 | Marolda | B63B 11/04 251/144 |
| 2005/0139262 A1 | * | 6/2005 | Burger | F16K 49/002 137/269 |
| 2015/0115183 A1 | | 4/2015 | Nobili | |
| 2020/0055508 A1 | * | 2/2020 | Chiba | B60T 17/02 |

* cited by examiner

FLUSH MOUNTED BUILT-IN BODY FOR A SANITARY FITTING WITH AT LEAST ONE PUSH BUTTON WHICH CAN BE VARIABLY POSITIONED

This nonprovisional application is a continuation of International Application No. PCT/EP2018/050960, which was filed on Jan. 16, 2018, and which claims priority to German Patent Application No. 10 2017 100 708.3, which was filed in Germany on Jan. 16, 2017, and which are both herein incorporated by reference.

BACKGROUND OF THE INVENTION

Field of the Invention

The present invention relates to a flush-mounted built-in body for a sanitary fitting, which can be attached within a wall opening, in a recess in a wall, or in some other support. Such flush-mounted built-in bodies have proven effective particularly in built-in walls and pre-wall systems.

Description of the Background Art

Flush-mounted built-in bodies are used to attach a functional unit in a wall, partition, or a support. The functional unit can comprise a thermostatic cartridge and/or a valve. Cold water and hot water can be mixed by means of the thermostatic cartridge to create a mixed water with a desired mixed water temperature, wherein a withdrawal quantity of the mixed water can be controlled by the valve. At least one mixed water line can be connected to the flush-mounted built-in body, said line via which the mixed water can be supplied to the sanitary fitting, such as, for example, a hand-held shower head, overhead shower head, nozzle, outlet, and/or the like on a shower and/or bathtub. The cold water connection is regularly connected to a cold water house connection and the hot water connection is regularly connected to a hot water house connection via corresponding pipes. In the case of different installation depths of the flush-mounted built-in bodies in the wall, partition, or support, push buttons and rotating knobs for actuating the flush-mounted built-in bodies can protrude to different extents from the wall. As a result, a uniform outer appearance of the push buttons and rotating knobs cannot be ensured after installation of the flush-mounted built-in bodies in the wall. In addition, if the flush-mounted built-in bodies are not installed precisely, stop forces or bending moments can be applied to the push buttons and rotating knobs. As a result, gaps that negatively affect the appearance can occur between the push buttons and rotating knobs or between the rotating knobs and a cover of the flush-mounted built-in body.

SUMMARY OF THE INVENTION

It is therefore an object of the present invention to solve at least partially the problems described with reference to the prior art and in particular to provide a flush-mounted built-in body for a sanitary fitting whose push buttons or rotating knobs can be adjusted to different installation depths of the flush-mounted built-in body.

In an exemplary embodiment, a flush-mounted built-in body for a sanitary fitting is provided, which includes: at least one valve for a liquid with a rotatable flow regulator and a threaded shaft, wherein the threaded shaft can be actuated for opening and closing the at least one valve in an axial direction of the at least one valve, at least one push button for actuating the threaded shaft of the at least one valve in the axial direction, wherein the at least one push button comprises an intermediate part, screwable with the threaded shaft, for setting the at least one push button in a desired position in the axial direction and a cover cap that can be connected nonrotatably to the threaded shaft for securing the intermediate part in the desired position, and at least one rotating knob for adjusting a flow rate of the liquid, wherein the at least one rotating knob is nonrotatably connected to the flow regulator of the at least one valve.

The flush-mounted built-in body is used in particular for sanitary fittings that are used in connection with showers and/or bathtubs. The sanitary fittings can be in particular water outlets, hand-held shower heads, nozzles, and/or the like. The flush-mounted built-in body is used in particular for attaching a functional unit. The functional unit comprises in particular a thermostatic cartridge or other mixing devices, such as, for example, manual mixers. Cold water and hot water in particular can be mixed by the thermostatic cartridge to create a mixed water with a desired mixed water temperature. The cold water in this case can have a cold water temperature which is in particular at most 25° C. (Celsius), preferably 1° C. to 25° C., particularly preferably 5° C. to 20° C. The hot water can have a hot water temperature which is in particular at most 90° C., preferably 25° C. to 90° C., particularly preferably 55° C. to 65° C. The functional unit is in particular disposed at least partially in a receiving space of a housing of the flush-mounted built-in body and/or is made substantially cylindrical. Such flush-mounted built-in bodies are regularly attached within a wall opening, in a recess in a wall, or in some other support.

Furthermore, the flush-mounted built-in body has at least one valve for a liquid. The at least one valve can also be part of the functional unit. The liquid is in particular the mixed water mixed by the thermostatic cartridge. The mixed water can be supplied from the thermostatic cartridge, for example, with at least one line in the functional unit to the at least one valve by means of which a volume flow rate or a flow rate of the mixed water can be controlled via the sanitary fitting. The at least one valve has a rotatable flow regulator with which a flow rate of the liquid can be controlled by the at least one valve. The volume flow rate or the flow rate of the liquid is thus adjustable via the sanitary fitting by means of the rotatable flow regulator. Furthermore, the at least one valve has a threaded shaft which can be actuated for opening and closing the at least one valve in an axial direction of the at least one valve. This means in particular that the threaded shaft has two stable positions in the axial direction of the at least one valve, between which the threaded shaft can be adjusted. In the one stable position, the at least one valve is at least partially or completely opened and in the other stable position it is completely closed. The axial direction runs in particular parallel to an axis of rotation of the rotatable flow regulator of the at least one valve. The threaded shaft is formed in particular rotationally fixed to a valve housing. For a rough adjustment of the depth of the flush-mounted built-in body, the threaded shaft can be shortened or sawed off after installation the flush-mounted built-in body.

The flush-mounted built-in body has at least one push button for actuating the threaded shaft of the at least one valve in the axial direction. This means in particular that the threaded shaft of the at least one valve is adjustable by means of the at least one push button in the axial direction between the two stable positions of the threaded shaft. By means of the at least one push button, a user of the sanitary fitting can thus start and end an outflow of the liquid from the sanitary fitting. The at least one push button has an intermediate part and a cover cap. The intermediate part is in particular ring-shaped and/or can be screwed to the threaded shaft in the axial direction for setting the at least one push button in a desired position. In other words, this means that a distance in the axial direction between the at least one valve and the at least one push button can be adjusted by means of the intermediate part, depending on an installation depth of the flush-mounted built-in body in a wall. The further the intermediate part is screwed onto the threaded shaft, the smaller the distance in the axial direction between the at least one valve and the at least one push button. The cover cap of the at least one push button can be connected nonrotatably to the threaded shaft, so that the intermediate part is secured in the desired position on the threaded shaft. After its connection to the threaded shaft, the cover cap prevents the intermediate part from rotating on the threaded shaft, so that the intermediate part cannot be screwed further onto and/or unscrewed from the threaded shaft. The cover cap therefore secures the intermediate part from being adjusted with respect to the threaded shaft in the axial direction. This enables a constant distance of all visible parts of the flush-mounted built-in body from one another. The appearance and operability are not impaired by the different installation depths of the flush-mounted built-in body. In addition, the position of the at least one push button with respect to at least one rotating knob can be very finely adjusted relative to an axis of rotation of the at least one rotating knob. Thus, it can be ensured that the upper edges of the at least one push button and the at least one rotating knob are arranged flush with one another within the permissible installation depths of the flush-mounted built-in body. The at least one rotating knob is used in particular for adjusting a flow rate of the liquid. For this purpose, the at least one rotating knob is connected nonrotatably to the flow regulator of the at least one valve. The at least one rotating knob is in particular formed at least partially tubular, so that the at least one push button can be disposed in the at least one rotating knob. In other words, the at least one rotating knob in particular surrounds the at least one push button.

It is also advantageous if the threaded shaft has a first thread and the intermediate part has a second thread. The first thread of the threaded shaft is in particular an external thread and/or in the case of the second thread of the intermediate part, in particular an internal thread. The intermediate part can be screwed with the second thread onto the first thread of the threaded shaft.

Furthermore, it is advantageous if the intermediate part has a first toothing and the cover cap has a second toothing. If the cover cap is connected nonrotatably to the threaded shaft, the first toothing of the intermediate part engages in the second toothing of the cover cap, so that the intermediate part cannot be rotated relative to the cover cap. The first toothing is made in particular on an end face of the intermediate part and/or the second toothing in particular on an end face of the cover cap.

It is also advantageous if the intermediate part has an outer circumferential surface, by means of which the at least one push button is guided in the at least one rotating knob and on which the at least one rotating knob slides during rotation of the at least one rotating knob. In particular, the outer circumferential surface has an outer diameter which substantially corresponds to an inner diameter of an inner circumferential surface of the rotating knob. The intermediate part and the cover cap of the at least one push button do not rotate with the at least one rotating knob when the at least one rotating knob rotates, but the at least one rotating knob slides with its inner circumferential surface on the outer circumferential surface of the intermediate part of the at least one push button.

The cover cap can have a first lug with which the cover cap can be inserted nonrotatably into an opening of the threaded shaft. The first lug of the cover cap extends in particular in the axial direction. For example, the first lug can have a polygonal, square, or rectangular cross section. The opening of the threaded shaft is formed in particular in one end face of the threaded shaft and/or in the axial direction. The opening also has a polygonal, square, or rectangular cross section. The first lug of the cover cap, after insertion into the opening of the threaded shaft, closes the opening of the threaded shaft in particular substantially completely.

It is advantageous in addition if the flow regulator has a second lug which can be inserted into at least one groove of the rotating knob. The at least one groove is made in particular in a rotating knob lower part and/or a rotating knob upper part of the at least one rotating knob. In addition, the at least one groove extends in particular in the axial direction. The second lug of the at least one flow regulator of the at least one valve also preferably extends in the axial direction and can be inserted into the at least one groove. A rotational movement of the at least one rotating knob for adjusting the flow rate of the liquid is thereby transmitted to the flow regulator of the at least one valve. In addition, the second lug of the flow regulator can be inserted in the axial direction at a variable depth into the at least one groove of the rotating knob, so that different installation depths of the flush-mounted built-in body can be compensated.

Furthermore, it is advantageous if the second lug can be inserted into a first groove of a rotating knob lower part and into a second groove of a rotating knob upper part. To this end, the first groove of the rotating knob lower part and the second groove of the rotating knob upper part are aligned.

It is advantageous further if the second lug can be inserted into the at least one groove in the axial direction.

In addition, it is advantageous if the second lug can be disposed to be movable in the at least one groove for setting the rotating knob in a desired position in the axial direction.

It is advantageous, moreover, if the flush-mounted built-in body has a base plate with a stop for the at least one rotating knob. The stop serves in particular to limit an angle of rotation of at least one rotating knob. The stop can in particular be an abrupt change in the diameter of an opening in the base plate for the at least one rotating knob.

The invention and the technical environment will be described in more detail hereinbelow with reference to the figures. It should be noted that the figures show a particularly preferred embodiment variant of the invention, but it is not limited thereto. In the figures, the same components are provided with the same reference numerals. In the drawings by way of example and schematically:

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
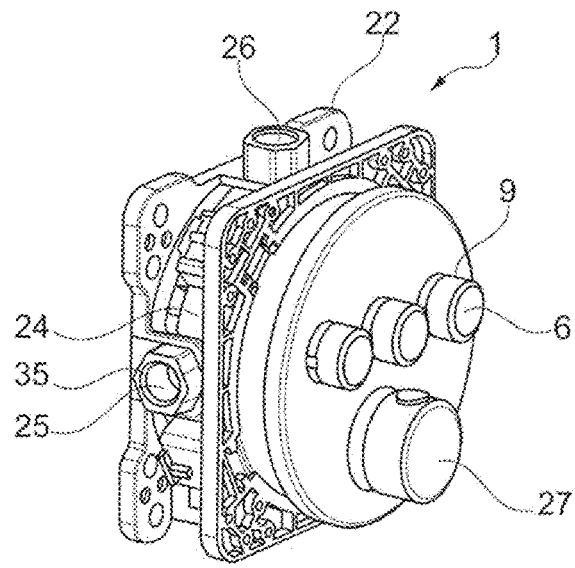
FIG. 1 shows a flush-mounted built-in body in a perspective view.

FIG. 1 shows a flush-mounted built-in body 1 in a perspective view. Flush-mounted built-in body 1 has a housing 24 with a connection ring 35 for connecting cold water and hot water supply lines and mixed water drain lines (not shown here). In the embodiment variant shown, connection ring 35 has three outlets, of which only a first outlet 25 and a second outlet 26 can be seen in FIG. 1. Flush-mounted built-in body 1 has three valves 2 which are disposed in housing 24 and are not visible in FIG. 1, and each of which can be actuated by a push button 6 for opening and closing the respective valve 2 and a rotating knob 9 for adjusting a flow rate of a liquid through the respective valve 2 or the respective outlet 25, 26. Furthermore, flush-mounted built-in body 1 has a rotating button 27 for actuating a thermostatic cartridge (not shown here) of the flush-mounted built-in body. A mixed water temperature of the mixed water mixed by the thermostatic cartridge can be adjusted by rotating button 27. In addition, flush-mounted built-in body 1 has a base plate 22 which can be placed on housing 24, for push buttons 6, rotating knobs 9, and rotating button 27. In addition, a (decorative) cover plate for the flush-mounted built-in body can be attached to base plate 22.

Figure 2:
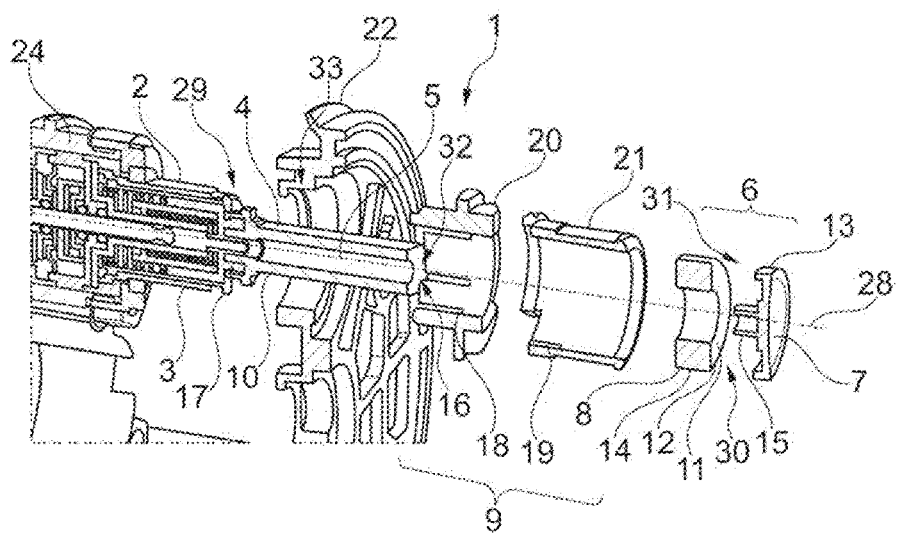
FIG. 2 shows an exploded view of a portion of the flush-mounted built-in body in cross section.

FIG. 2 shows a section of an exploded view of flush-mounted built-in body 1 in cross section. One of the valves 2 can be seen in housing 24. On a first end face 29 of the substantially cylindrical valve 2, a threaded shaft 4 is clipped in rotationally fixed with respect to valve 2. Threaded shaft 4 can be adjusted in an axial direction 5 parallel to an axis of rotation 28 of a flow regulator 3 for opening and closing valve 2. Threaded shaft 4 has a first thread 10, which is designed as an external thread. A ring-shaped intermediate part 8 of push button 6 with a second thread 11, which is designed as an internal thread, can be screwed onto first thread 10. The position of push button 6 relative to valve 2 can be adjusted in the axial direction 5 on threaded shaft 4 of valve 2 depending on a screw-on depth. After intermediate part 8 has been screwed onto threaded shaft 4, a first lug 15 of a cover cap 7 of push button 6 can be inserted into a first opening 16 in a fourth end face 32 of threaded shaft 4 rotationally fixed with respect to threaded shaft 4. After inserting first lug 15 of cover cap 7 into first opening 16 of threaded shaft 4, a second toothing 13 on a third end face 31 of cover cap 7 engages in a first toothing 12 on a second end face 30 of intermediate part 8, so that intermediate part 8 is secured in the desired position on threaded shaft 4. As a result, intermediate part 8 cannot be rotated with respect to cover cap 7, so that intermediate part 8 cannot be screwed further onto or unscrewed from threaded shaft 4. Threaded shaft 4 can be actuated in axial direction 5 by a user pressing on cover cap 7 to open and close valve 2. Rotating knob 9 comprises a rotating knob lower part 20 with a first groove 18 and a rotating knob upper part 21 with a second groove 19. A second lug 17 of flow regulator 3 of valve 2 can be inserted in first groove 18 and second groove 19, so that flow regulator 3 can be rotated by rotating knob 9 about its axis of rotation 28 to adjust the flow rate of the liquid through valve 2. Base plate 22 has a second opening 33 into which lower part 20 of rotating knob 9 can be inserted. Rotating knob lower part 20 can be rotated in second opening 33 of base plate 22 about axis of rotation 28 by rotating knob upper part 21.

Figure 3:
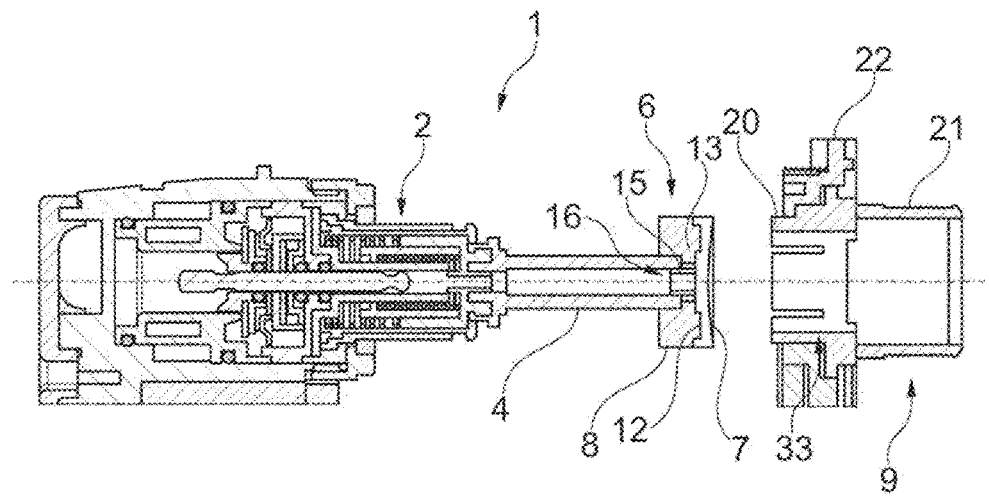
FIG. 3 shows a portion of the flush-mounted built-in body with an intermediate part, screwed onto a threaded shaft, of a push button in a sectional view.

FIG. 3 shows flush-mounted built-in body 1 after intermediate part 8 of push button 6 has been screwed onto threaded shaft 4. First lug 15 of cover cap 7 is inserted into first opening 16 of threaded shaft 4, so that first toothing 12 of intermediate part 8 engages with second toothing 13 of cover cap 7. This secures the position of intermediate part 8 on threaded shaft 4 of valve 2. Rotating knob upper part 21 is connected to lower part 20 of rotating knob 9 and rotating knob lower part 20 is locked in second opening 33 of base plate 22.

Figure 4:
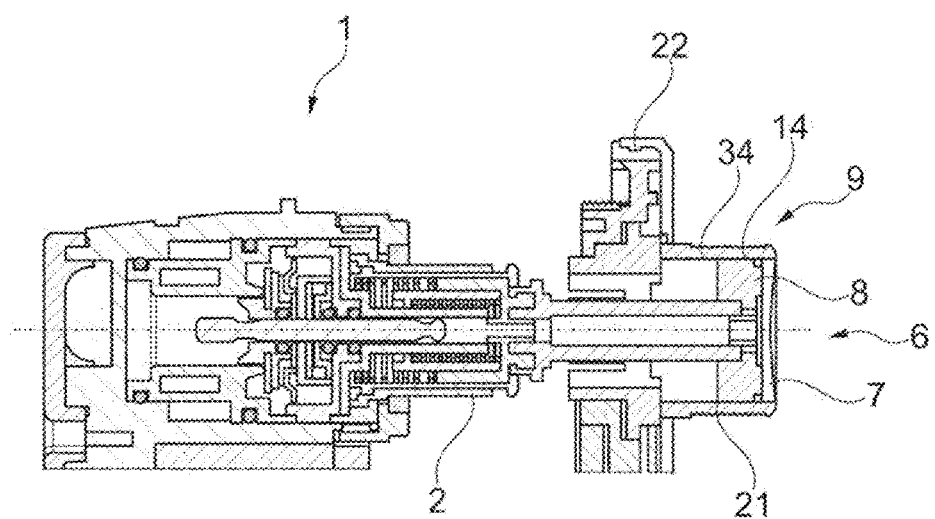
FIG. 4 shows the portion of the flush-mounted built-in body shown in FIG. 3 after a rotating knob has been placed on the intermediate part of the push button.

FIG. 4 shows a partial view of flush-mounted built-in body 1 in the area of valve 2 in a sectional view. In FIG. 4, base plate 22 with rotating knob 9 is pushed onto intermediate part 8 and cover cap 7 of push button 6. Push button 6 is guided by an outer circumferential surface 14 of intermediate part 8 in rotating knob 9, in which outer circumferential surface 14 of intermediate part 8 comes into contact with an inner circumferential surface 34 of the rotating knob upper part. When rotating knob 9 is rotated, inner circumferential surface 34 of rotating knob upper part 21 slides on outer circumferential surface 14 of intermediate part 8 without intermediate part 8 or cover cap 7 of push button 6 rotating.

Figure 5:
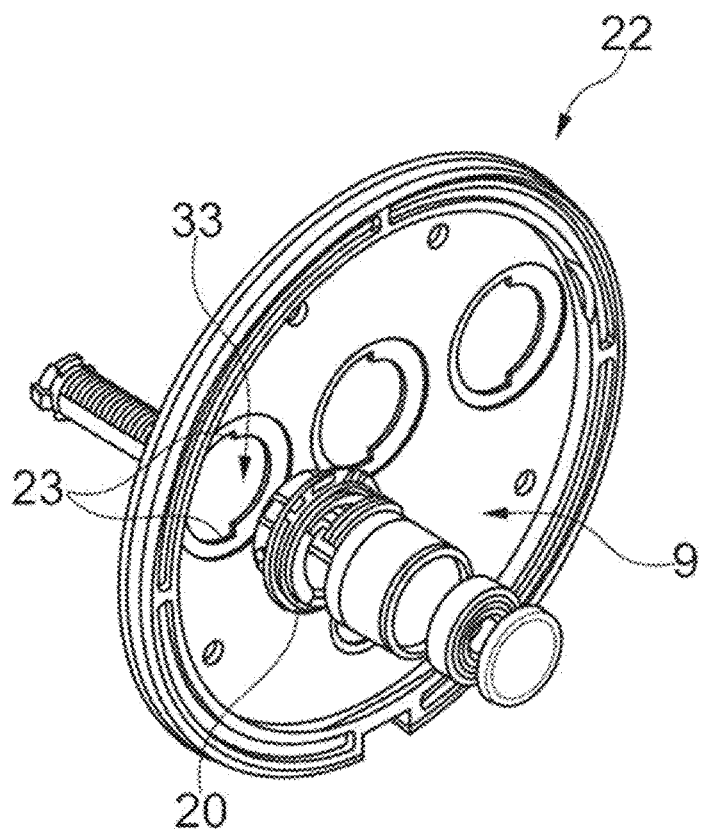
FIG. 5 shows a base plate of a flush-mounted built-in body in a perspective view.

FIG. 5 shows base plate 22 in a perspective view. Three second openings 33 of base plate 22 each have two stops 23, which act together with the lower part 20 of rotating knob 9, so that an angle of rotation of rotating knob 9 is limited. Stops 23 here are designed as a diameter step of second opening 33 and are offset to one another by 180° relative to axis of rotation 28 shown in FIG. 2.

The present invention is characterized in particular by the easy adaptability of a push button and rotating knob to the installation depth of a flush-mounted built-in body.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A flush-mounted built-in body for a sanitary fitting, comprising:
  at least one valve for a liquid having a rotatable flow regulator and a threaded shaft, the threaded shaft being adapted to be actuated for opening and closing the at least one valve in an axial direction of the at least one valve;
  at least one push button to actuate the threaded shaft of the at least one valve in the axial direction, the at least one push button comprising an intermediate part screwable with the threaded shaft to set the at least one push button in a desired position in the axial direction and a cover cap that is connected nonrotatably to the threaded shaft to secure the intermediate part in the desired position; and at least one rotating knob for adjusting a flow rate of the liquid, the at least one rotating knob being nonrotatably connected to the flow regulator of the at least one valve.

2. The flush-mounted built-in body according to claim 1, wherein the threaded shaft has a first thread and the intermediate part has a second thread.

3. The flush-mounted built-in body according to claim 1, wherein the intermediate part has a first toothing and the cover cap has a second toothing.

4. The flush-mounted built-in body according to claim 1, wherein the intermediate part has an outer circumferential surface, via which the at least one push button is guided in the at least one rotating knob and on which the at least one rotating knob slides during rotation of the at least one rotating knob.

5. The flush-mounted built-in body according to claim 1, wherein the cover cap has a first lug with which the cover cap is inserted nonrotatably into a first opening of the threaded shaft.

6. The flush-mounted built-in body according to claim 1, wherein the flow regulator has a second lug which is inserted into at least one groove of the rotating knob.

7. The flush-mounted built-in body according to claim 5, wherein the second lug is inserted into a first groove of a rotating knob lower part and into a second groove of a rotating knob upper part.

8. The flush-mounted built-in body according to claim 5, wherein the second lug is inserted into the at least one groove in the axial direction.

9. The flush-mounted built-in body according to claim 5, wherein the second lug for setting the rotating knob in a desired position in the axial direction is disposed to be movable in the at least one groove.

10. The flush-mounted built-in body according to claim 1, further comprising a base plate with a stop for the at least one rotating knob.

* * * * *